June 12, 1928.  
C. WAGNER  
BOLSTER SUPPORT  
Filed Aug. 6, 1926  
1,673,652

Inventor  
CHARLES WAGNER  
By *Beales Park*  
Attorney.

Patented June 12, 1928.

1,673,652

UNITED STATES PATENT OFFICE.

CHARLES WAGNER, OF NORRISTOWN, PENNSYLVANIA, ASSIGNOR OF ONE-HALF TO THEODORE HOVELL, OF NORRISTOWN, PENNSYLVANIA.

BOLSTER SUPPORT.

Application filed August 6, 1926. Serial No. 127,587.

My invention is a bolster support adapted to be placed between the longitudinal bolster and cross beam used in forming truck bodies and the like.

My device is adapted to be bolted to the longitudinal bolster and to the cross beam of a truck body thus providing a bearing surface for the cross beam.

An advantage of my device is the positive connection afforded between the bolster and cross beam.

Another advantage is in the bolts provided for securing my device to the bolster and the cross beam, in that the nuts upon the bolts and clip bails are in the open where they may be easily set up when loosened by the constant shaking of the truck body.

It will also be apparent that my device provides a wearing plate between the bolster and cross beam.

Still another advantage is provided by the flanges of my device which align at right angles the bolster and cross beam.

Referring to the drawings Fig. 1 shows a top plan view of my bolster support in connection with bolster and cross beam.

Figure 1:
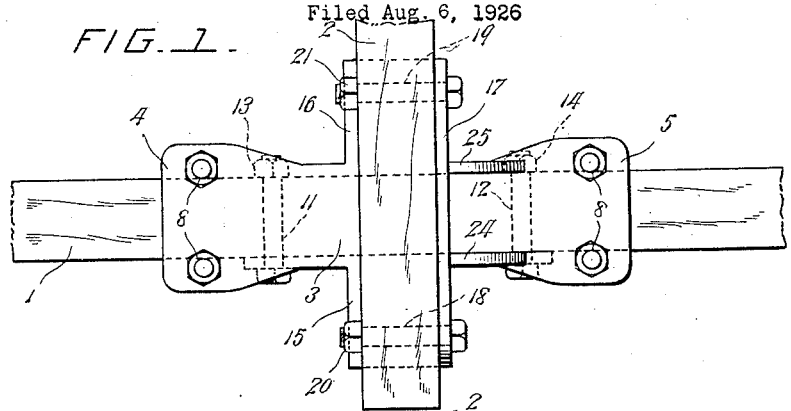
Figure 2:
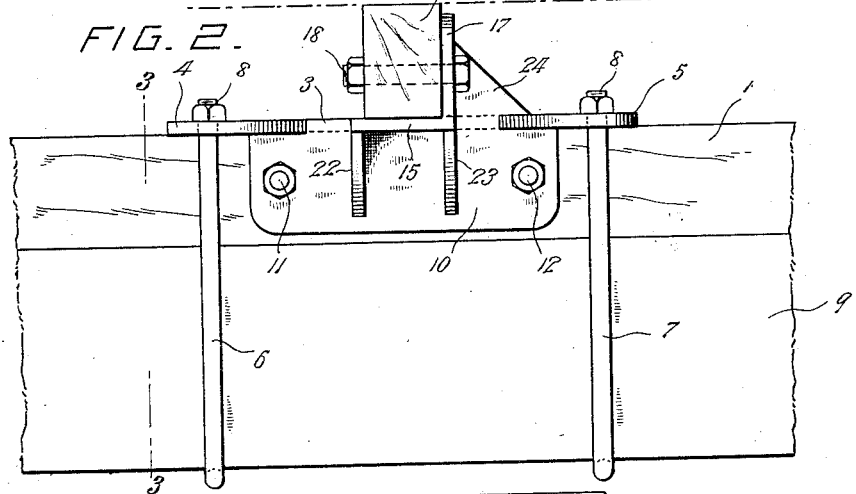
Fig. 2 is a side view of my device in connection with the angle iron of a vehicle chassis, the bolster and the cross beam.
Figure 3:
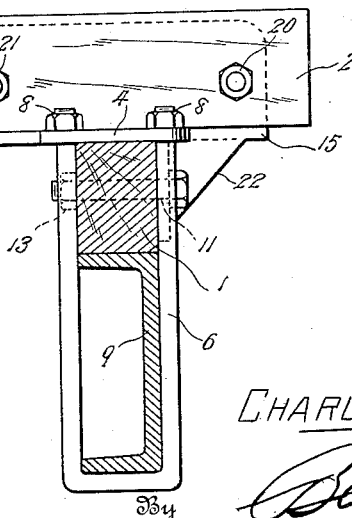
Fig. 3 is a cross section on the line 3—3 of Fig. 2.

Referring more particularly to the drawings 1 denotes a bolster of a vehicle chassis, 2 one of the cross bars or beams. My device is provided with a bearing and wearing plate 3 having winged portions 4 and 5 having holes for the reception of clip bails 6 and 7 provided with nuts 8. These clip bails hold my device in positive alignment with bolster 1 and angle iron 9 of the vehicle chassis.

Longitudinally to the wearing plate 3 and arranged below and to one side and integral therewith is formed a bolster supporting flange 10 provided with holes adapted to receive bolts having nuts 13 and 14. These bolts securely attach flange 10 to bolster 1.

The wearing plate 3 is also provided with supporting extensions 15 and 16. Upon these extensions and the wearing plate 3 and integral therewith, I provide an upright flange 17 provided with holes for the reception of bolts 18 and 19 having nuts 20 and 21 for securing the cross beam 2 to the flange 17.

Braces 22, 23, 24 and 25 are provided to reinforce my device and to make it positively rigid.

It is further pointed out that my device may be used to repair or renovate old trucks. Without wholly dis-assembling the body my device may be inserted between the body beam and the chassis beam it being necessary to only slightly separate these cross beams in order to slide my device into place.

It is understood that I may make my device in many different structural forms without departing from the spirit of my invention.

Having thus described my invention what I claim and desire to secure by Letters-Patent is:—

A bolster support comprising a wearing plate; wings adapted to be connected to a vehicle chassis; supporting flanges adapted to carry a cross-beam; a lower flange adapted to be fastened to the said chassis and an upper flange adapted to be secured to the said cross-beam as and for the purpose set forth.

In testimony that I claim the foregoing as my own, I affix my signature.

CHARLES WAGNER.